US008171346B2

(12) United States Patent
Stairs et al.

(10) Patent No.: US 8,171,346 B2
(45) Date of Patent: May 1, 2012

(54) CLIENT SESSION BASED DEBUGGING

(75) Inventors: John Stairs, Copenhagen (DK);
Thomas Hejlsberg, Horsholm (DK)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 12/721,170

(22) Filed: Mar. 10, 2010

(65) Prior Publication Data
US 2011/0225460 A1 Sep. 15, 2011

(51) Int. Cl.
*G06F 11/00* (2006.01)
(52) U.S. Cl. ......... 714/38.1; 714/25; 714/30; 714/38.14
(58) Field of Classification Search ............... 714/25, 714/30, 38.1, 38.12, 38.13, 38.14; 717/124, 717/129
See application file for complete search history.

(56) References Cited

U.S. PATENT DOCUMENTS

| 5,815,653 | A * | 9/1998 | You et al. ............ 714/38.13 |
| 5,819,093 | A * | 10/1998 | Davidson et al. ...... 714/38.13 |
| 6,324,683 | B1 | 11/2001 | Fuh et al. |
| 7,634,761 | B2 | 12/2009 | Buschardt et al. |
| 2005/0193264 | A1* | 9/2005 | Khan et al. ............ 714/38 |
| 2005/0246682 | A1 | 11/2005 | Hines |
| 2007/0168997 | A1* | 7/2007 | Tran ............... 717/129 |
| 2007/0276692 | A1 | 11/2007 | Mei et al. |
| 2009/0106739 | A1 | 4/2009 | Weatherbee et al. |
| 2009/0119513 | A1 | 5/2009 | Chung |
| 2011/0131295 | A1* | 6/2011 | Jolfaei ................ 714/37 |

OTHER PUBLICATIONS

Hunt, et al. Debugging Java Applications, informIT, www.informit.com/articles/printerfriendly.aspx?p=406342, Aug. 12, 2005, pp. 19.*
"PHP Debugging: Advanced Features Set", Retrieved at <<http://www.nusphere.com/products/php_debugger_advanced.htm>>, Jan. 28, 2010, pp. 2.
Hunt, et al., "Debugging Java Applications", Retrieved at <<http://www.informit.com/articles/article.aspx?p=406342>>, Aug. 12, 2005, pp. 7.
Sen, Saikat, "Windows Debuggers: Part 1: A WinDbg Tutorial", Retrieved at <<http://www.codeproject.com/KB/debug/windbg_part1.aspx>>, Mar. 22, 2004, pp. 8.
"Controlling a Remote Debugging Session", Retrieved at <<http://msdn.microsoft.com/en-us/library/cc266441.aspx>>, Jan. 28, 2010, pp. 2.

* cited by examiner

*Primary Examiner* — Robert Beausoliel, Jr.
*Assistant Examiner* — Joseph D Manoskey
(74) *Attorney, Agent, or Firm* — Turk IP Law, LLC

(57) ABSTRACT

Debugging operations on individual client sessions for a remotely executed shared application are enabled to be performed as the client requests are processed on the executing server without disrupting execution of other client sessions. A remote debugging client may connect to a debugging engine executed on the server allowing the debugging client to view source code, set breakpoints, view client connections, and receive callbacks or notifications when a breakpoint is hit by the client session being debugged. The debugging client may also control execution by stepping through client code enabling debugging of multiple clients simultaneously.

17 Claims, 7 Drawing Sheets

CLIENT SESSION BASED DEBUGGING

BACKGROUND

With the proliferation of network communications and bandwidth availability, remote applications have become a common occurrence. Instead of installing, maintaining, debugging, updating, and performing similar operations on a large number of client devices for the same application, the application may be executed in a single server with the client devices accessing it through individual sessions. The ability to serve multiple clients through a single application on a remote server reduces maintenance costs, eases update and problem solving operations, and reduces a need for requiring minimum system parameters from clients. For example, modern application codes are relatively large compared to older versions requiring larger memory and processing power for the executing machines. On the other hand, accessing a remotely executed application, a client device may not need to have the same system resources as it would need if the application was executed on the same client device.

Debugging an application executed on a remote server or service may be a challenging task. If the service handles multiple concurrent requests from clients, allowing the debugging to block other clients may degrade the user experience. Reliability and security are also concerns with concurrent debugging. When debugging of client processes are performed on a thread or process level, debugging operations may affect servicing of requests by other clients.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to performing debugging operations on individual client sessions for a remotely executed shared application (physically or process-wise) as the client requests are processed on the executing server without disrupting execution of other client sessions. According to some embodiments, a remote debugging client may connect to a debugging engine executed on the server allowing the debugging client to view source code, set breakpoints, view client connections, and receive callbacks or notifications when a breakpoint is hit by the client session being debugged. Multiple clients may be debugged separately, and their execution controlled each by separate debugging clients.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
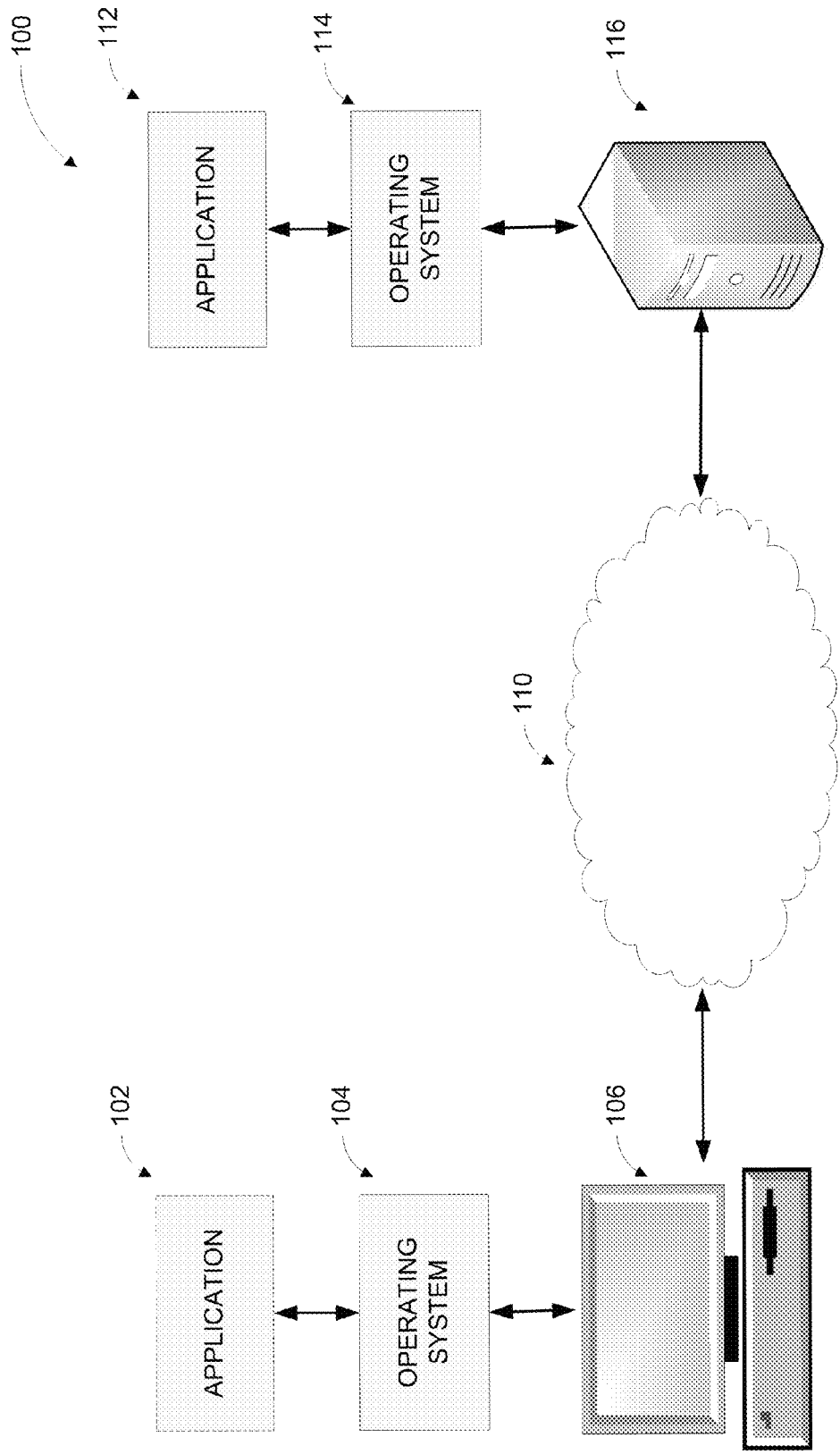
FIG. 1 is a conceptual diagram illustrating a client device accessing a remotely executed application on a server.

As briefly described above, client session based debugging may be performed employing a debugging client executed on the server enabling debugging of individual client sessions without disrupting execution of other client sessions. A remotely executed application, as mentioned herein, refers to physically separate processes as well as logically separate processes. Thus, a client session may be executed on the same machine as another but be part of a separate process and implement embodiments. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing remote application services and related network communications. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating a client device accessing a remotely executed application on a server. A remotely executed application, as mentioned herein, refers to physically separate processes as well as logically separate processes. Thus, a client session may be executed on the same machine as another but be part of a separate process and implement embodiments. As opposed to conventional applications which are installed and wholly executed on a client machine, remotely executed applications such as application 112 can be shared by multiple clients, which may still be on the same machine. In a virtualized environment each client may be logically remote in each virtual machine, but physically on the same machine.

Remotely executed application 112 is executed within the framework of operating system 114 of server 116. Client device 106 may connect to server 116 through network(s) 110 and establish a session. Thus, for a user of client device 106, it may appear as if application 112 is running on operating system 104 as application 102 (indicated by the dashed lines) without client device 106 having to support the application with traditional system resources such as memory, processing power, registries, etc.

In addition to the reduced need for system resources for executing the remote application, application 112 may be accessed by (executed for) multiple clients simultaneously. Similarly, client device 106 in conjunction with operating system 104 may provide access to multiple remote applications at a fraction of system resources and without having to install, maintain, or update the individual applications.

Figure 2:
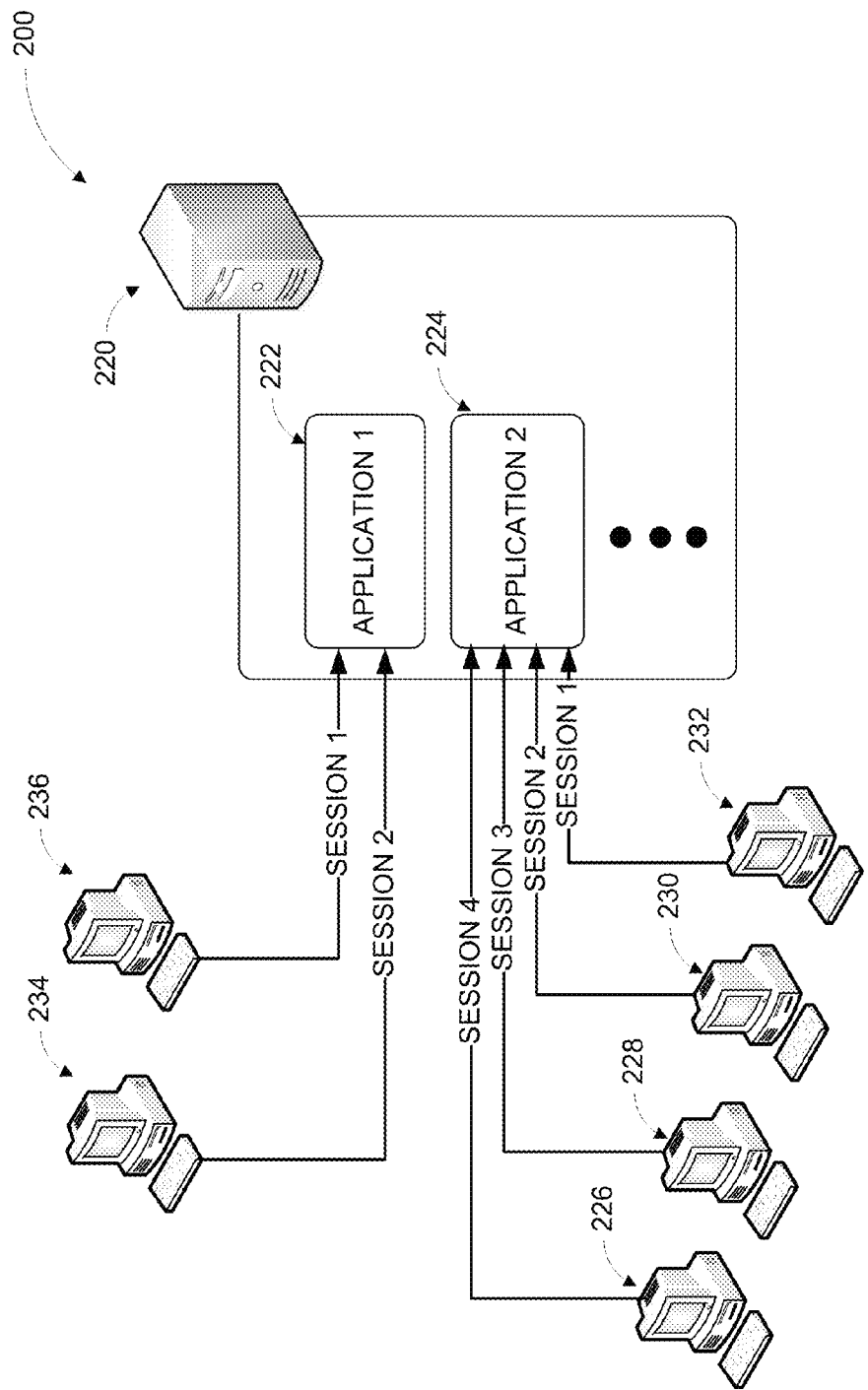
FIG. 2 is another conceptual diagram illustrating a plurality of client devices accessing remotely executed applications on a server through sessions.

FIG. 2 includes another conceptual diagram 200 illustrating a plurality of client devices accessing remotely executed applications on a server through sessions. As mentioned above, a remotely executed application may be shared by a plurality of clients. In a system according to embodiments, each client may establish a separate session with its remote application, which may be used to debug the executed code without interrupting the execution of the other sessions.

In the example scenario of diagram 200, server 220 executes applications 222 and 224. Clients 234 and 236 share application 222 through their individual sessions. Application 224 is shared by clients 226, 228, 230, and 232 through their respective sessions. A debugging engine executed on server 220 may enable client codes (codes executed on behalf of each client on the server) to report their status and further enable one or more remote debugging clients to attach to and control individual sessions. Thus, in a server with multiple client sessions, execution of a particular session being debugged may be broken as opposed to conventional per thread or per process breaks. Multiple client sessions may be debugged simultaneously in a secure way remotely. Furthermore, global break points may be set up enabling debugging clients to find which client session to break based on a predefined break point (not client session).

Figure 3:
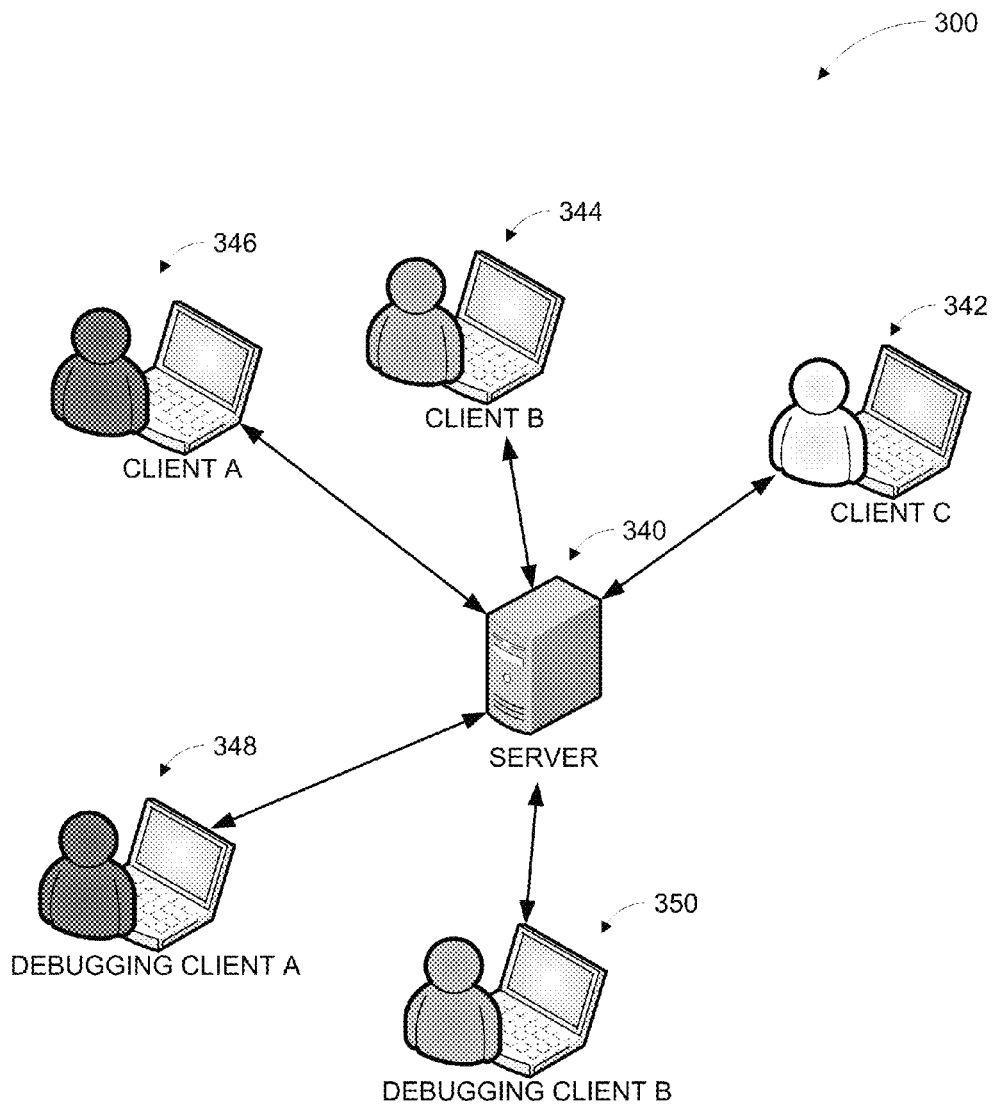
FIG. 3 is a diagram illustrating two different debugging clients attaching to a server for debugging different client codes executed on the server according to embodiments.

FIG. 3 is a diagram illustrating two different debugging clients attaching to a server for debugging different client codes executed on the server according to embodiments. Diagram 300 illustrates server 340 executing one or more remote applications as discussed above. Clients 342, 344, and 346 may access server 340 through individual sessions. Debugging clients 348 and 350 also access server 340 through individual debugging sessions.

In a system according to embodiments, each session may be debugged individually allowing other sessions to continue execution without interruption. A debugging engine executed on the server may enable client codes to report their status to the debugging engine through a session object established by the client code. The status of the executing code (e.g. break points) and additional information may be provided to a remote debugging client such as debugging client 348 or 350 enabling the remote debugging clients to control the debugging process.

In the example scenario of diagram 300, three clients (342, 344, and 346) and two debugging clients (348 and 350) are connected to server 340. If debugging client A 348 attaches to client A's (346) session and debugging client B 350 attaches to client B's (344) session, then debugging client A 348 may control, inspect, and/or analyze the execution of client session A on the server 340. Debugging client B 350 may do so for client session B. Thus, client C 342 is not affected by either debugging client.

Figure 4:
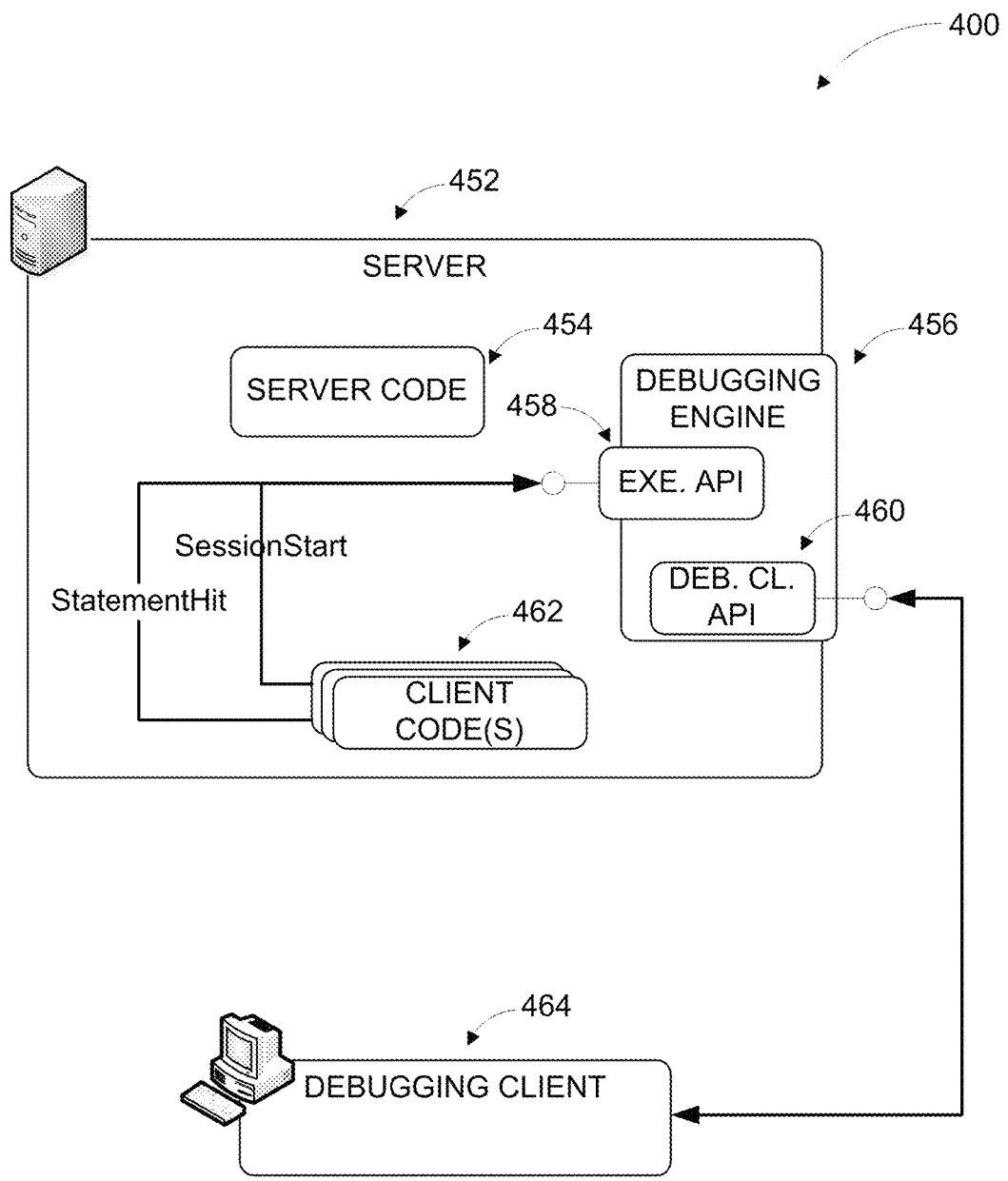
FIG. 4 illustrates interactions between different components of a server-client system for performing client session based debugging according to embodiments.

FIG. 4 illustrates interactions between different components of a server-client system for performing client session based debugging according to embodiments. While diagram 400 shows one server and one debugging client executed on a client machine, systems according to embodiments may include multiple servers and/or clients.

Server 452 may execute server code 454 and/or client code 462, server code 454 being code not accessible to the client(s) or code that should not be debugged (e.g. the debugger engine itself or other part of framework code). Client code 462 is the code executed on the server on behalf of a particular client. Execution application programming interface (API) 458 may be exposed by the server itself and called by client code 462 executed on behalf of a client in the context of a client session. Debugging engine 456 may expose debugging client API 460 called by remote debugging client 464.

Client code 462 may call a SessionStart method on the execution API 458 once and establish a session object for keeping track of the session/client and distinguishing it from other sessions/clients. A session object may be returned to the client code 462 as a result of this call. Subsequently, client code 462 may periodically invoke the StatementHit method on the execution API 458, informing the debugging engine 456 about the code's location and its associated client session through the session object. The StatementHit method may typically be called before each logical statement is executed and the call itself may be inserted or injected into the code by instrumentation.

The StatementHit method may then determine if a debugging client 464 is attached to the given connection. The method may further determine if the execution should be a "break" (i.e. if a break point has been set on the given statement and any associated conditions evaluate to true) or the debugging client 464 is stepping though individual statements. If the debugging engine 456 determines that it should break, the associated remote debugging client 464 may be notified. According to some embodiments, execution may not return to the calling code until the debugging client issues a "continue" command.

According to other embodiments, the call stack, variables, execution history, and comparable information may be computed in the implementation of StatementHit, and made available to the debugging client on request. The debugging client API 460 enables the external debugging client 464 to connect to the debugging engine 456. This API may enable the debugging client 464 to perform one or more of the following: view a list of client sessions executing on the server; select a client session to debug; set breakpoints, optionally attaching conditions; receive notifications when a breakpoint is hit; query the current location of the code relative to the original, uninstrumented source code; and query call stack, variable values, execution history, and related metadata.

Although many of the above described actions are "locked down" into a single client session, some may also be allowed to be "global". Thus, any client/session that hits a particular breakpoint/condition may trigger a given action according to further embodiments. This may be employed when a debugging client is expected to take an action, but it is not known up front which client is to be debugged.

The example systems in FIGS. 1, 2, 3, and 4 have been described with specific servers, client devices, software modules, and interactions. Embodiments are not limited to systems according to these example configurations. Client session based debugging may be implemented in configurations employing fewer or additional components and performing other tasks. Furthermore, specific protocols and interfaces have been discussed in conjunction with describing embodiments above. Embodiments are also not restricted to those examples. Other protocols, exchanges, and interfaces may be implemented in a similar manner using the principles described herein.

Figure 5:
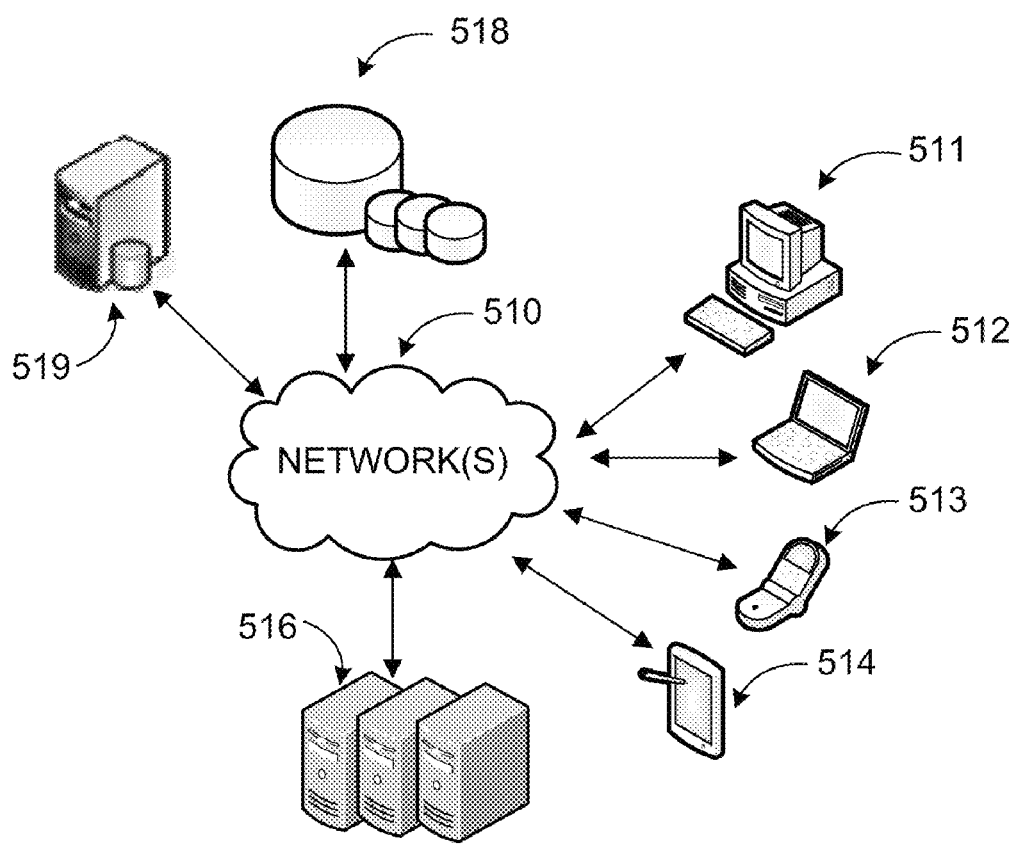
FIG. 5 is a networked environment, where a system according to embodiments may be implemented.

FIG. 5 is an example networked environment, where embodiments may be implemented. A platform providing remote application services may be implemented via software executed over one or more servers 516 such as a hosted service. The platform may communicate with client applications on individual computing devices such as desktop computer 511, laptop computer 512, smart phone 513, or handheld computing device 514 ('client devices') through network(s) 510.

As discussed above, users may access applications remotely executed on one or more of servers 516 through client devices 511-514. A debugging engine executed on server 516 may expose an execution API and a debugging client API enabling debugging of client code on the server at session level without interrupting execution of client codes for other clients. The remotely executed application may retrieve necessary data from data store(s) 518 directly or through database server 519.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a framework for client session based debugging. Furthermore, the networked environments discussed in FIG. 5 are for illustration purposes only. Embodiments are not limited to the example applications, modules, or processes.

Figure 6:
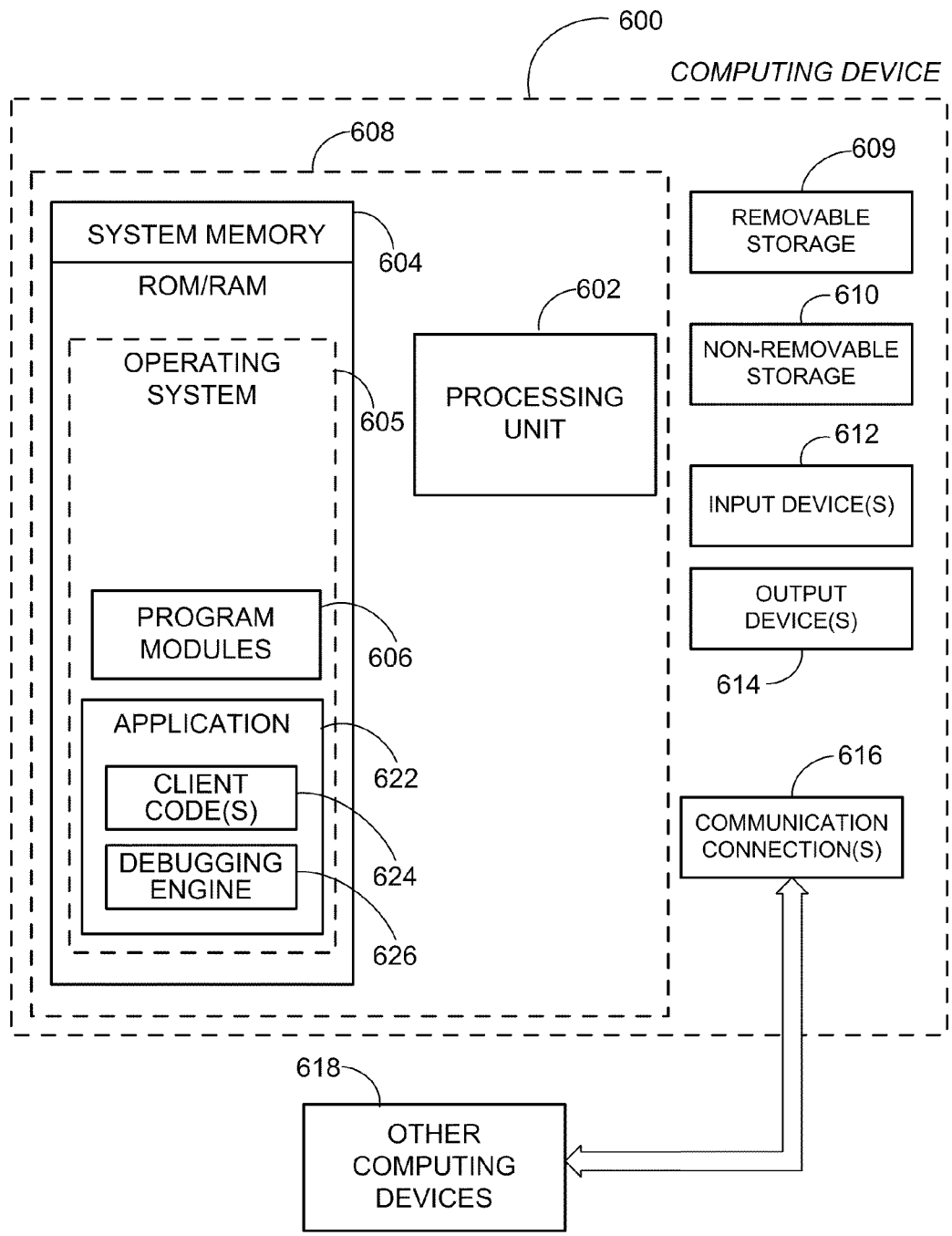
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server executing a remote application enabling client session based debugging according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, client codes 624, and debugging engine 624.

Application 622 may be any application that is remotely executed on computing device 600 and accessed by one or more client devices. Application 622 may comprise server code, which is not accessible by client devices (or debuggable), and client code(s). Client code(s) may be debugged employing debugging engine 626 as described previously. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
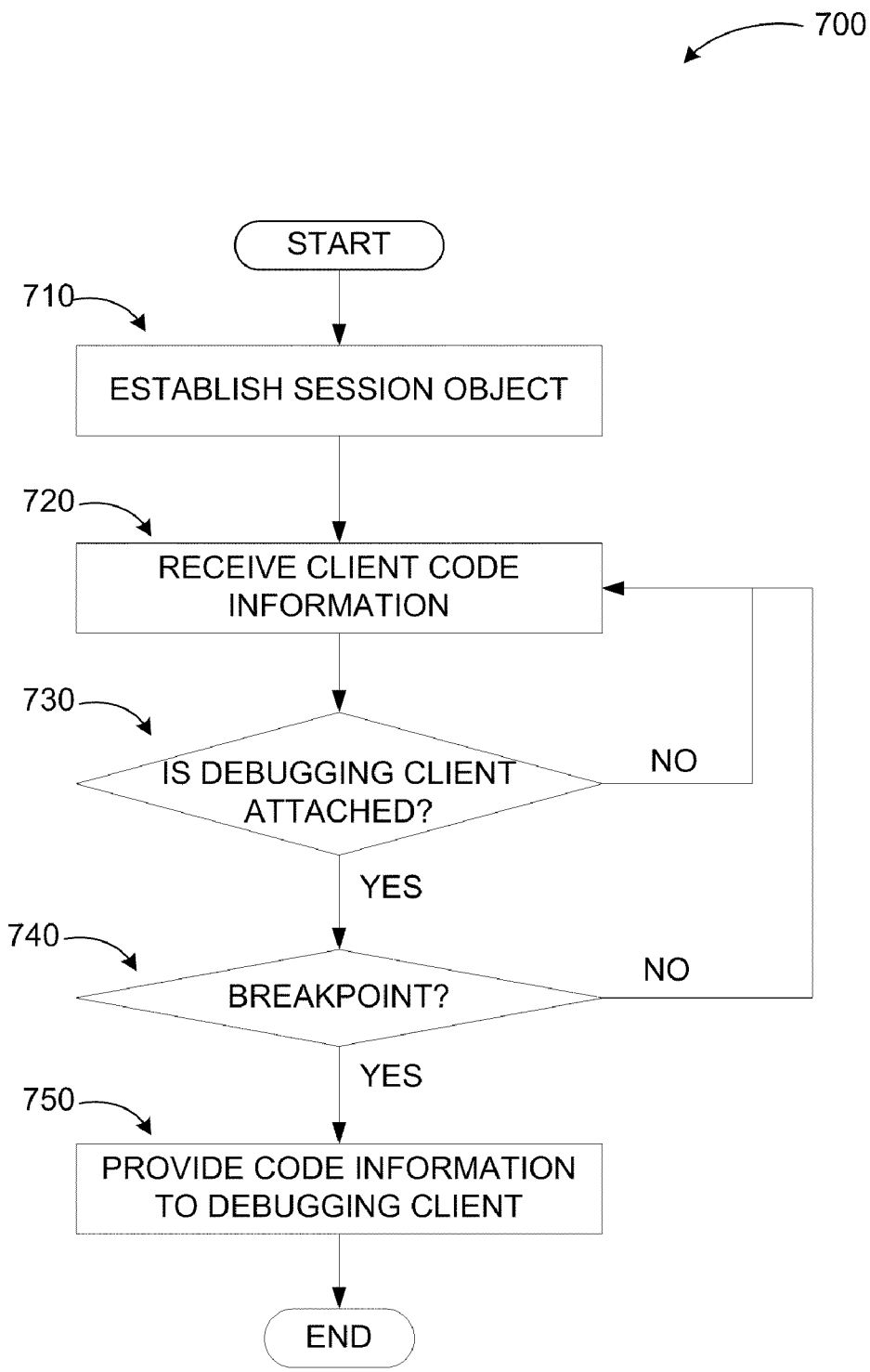
FIG. 7 illustrates a logic flow diagram for a process of performing client session based debugging according to embodiments.

FIG. 7 illustrates a logic flow diagram for process 700 of performing client session based debugging according to embodiments. Process 700 may be implemented as part of a server executing remote applications.

Process 700 begins with operation 710, where a session object may be established for a client upon receipt of a StatementHit method from the client code at the execution API exposed by the debugging engine. The session object may keep track of the session/client and distinguish it from other sessions/clients.

At operation 720, the client code may inform the debugging engine of the code's location and its associated client session through the session object. The client code may accomplish this by invoking a StatementHit method, typically before each logical statement is executed. The StatementHit method may determine if a debugging client is attached to the given connection at decision operation 730. If the debugging client is attached, it may further determine whether the execution is a break point at operation 740. If the engine determines it should break, the associated remote debugging client may be notified. The execution may wait returning to the calling client code until the debugging client issues a continue command. Information including call stack, variables, execution history, etc. may be computed in the implementation of StatementHit and provided to the debugging client on request at operation 750.

The operations included in process 700 are for illustration purposes. Client session based debugging may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for performing client session based debugging, the method comprising:
receiving identification information associated with a session of client code executed on a server at a debugging engine;
determining whether a debugging client is attached to the session;
if the debugging client is attached, determining whether a breakpoint in execution of the client code is reached;
if the break point is reached, providing client code information to the attached debugging client enabling the debugging client to control debugging process without interrupting any other sessions of the client code on the server; and
establishing a session object in response to a method call from the client code, wherein the client code information is received through periodic calls from the client code using the session object, prior to execution of a logical statement, and wherein the identification information included in the session object is associated with a location of the client code and the associated session.

2. The method of claim 1, further comprising:
returning the session object to the calling client code, wherein the session object is employed to keep track of the session and distinguish the session from the other sessions of the client code.

3. The method of claim 1, wherein determining whether a break point is reached includes:
determining whether a break point is set on a particular statement; and
determining whether at least one associated condition is true.

4. The method of claim 1, further comprising:
pausing the execution of the client code until a continue command is received from the debugging client.

5. The method of claim 1, further comprising:
computing at least one from a set of: a call stack, one or more variables, and execution history; and
providing the computed information to the debugging client on request.

6. The method of claim 1, wherein the debugging client is enabled to perform at least one from a set of: viewing a list of client sessions executing on the server; selecting a client session to debug; setting breakpoints; receiving notifications regarding break points; and querying a current location of the client code.

7. The method of claim 6, wherein the debugging client is further enabled to perform at least one from a set of: attaching conditions to break points and querying at least one of: call stack, variable values, execution history, and related metadata.

8. The method of claim 1, wherein the break point is defined as global such that any session of the client code reaching the break point is attached to the debugging client.

9. A server for executing shared applications and providing client session based debugging, the server comprising:
a memory storing executable instructions;
a processor coupled to the memory, the processor executing a plurality of sessions of a client code and a debugging engine, wherein the debugging engine is configured to:
receive a location of the client code and an associated session identification from the client code through a session object;
establish the session object in response to a method call from the client code through an execution application programming interface (API) and receive periodic method calls with the location of the client code and the associated session identification from the client code through the execution API;
determine whether a debugging client is attached to the identified session;
if the debugging client is attached, determine whether a breakpoint in execution of the client code is reached;

if the break point is reached, determine if at least one condition associated with the break point is true; and if the at least one condition is true, provide the location of the client code and the associated session identification to the attached debugging client enabling the debugging client to control debugging process without interrupting any other sessions of the client code on the server.

10. The system of claim 9, wherein the debugging engine is further configured to notify the attached debugging client about the location of the client code where the break point is reached and the associated session identification through a debugging client API.

11. The system of claim 10, wherein the debugging engine is further configured to receive information associated with at least one from a set of: selection of a client session to debug, setting of break points, attaching conditions to break points, and querying of a current location of the client code from the debugging client through the debugging client API.

12. The system of claim 10, wherein the debugging engine is further configured to provide information associated with at least one from a set of: a call stack, one or more variables, execution history, a list of client sessions executing on the server, and notifications regarding break points to the debugging client through the debugging client API.

13. The system of claim 9, wherein the processor is configured to execute a plurality of applications, each application being shared by clients.

14. The system of claim 9, wherein the processor is configured to execute a server code inaccessible to any clients, the server code including at least one of: the debugging engine and framework code.

15. A computer-readable storage medium with instructions stored thereon for client session based debugging, the instructions comprising:

establishing a session object at a debugging engine in response to an initial method call from a client code, wherein the session object is employed to keep track of a session of the client code and distinguish the session from other sessions of the client code;

returning the session object to the calling client code;

receiving information associated with a location of the client code and the associated session through a periodic method call from the client code;

determining whether a debugging client is attached to the session;

if the debugging client is attached, determining whether a breakpoint in execution of the client code is reached and at least one condition associated with the break point is true; and if the break point is reached and the condition is true, pausing the execution of the client code until a continue command is received from the debugging client, and providing the received client code information to the attached debugging client enabling the debugging client to control debugging process without interrupting any other sessions of the client code on the server.

16. The computer-readable medium of claim 15, wherein calls from the client code are received through an internal execution API exposed to the client code and calls from the debugging client are received through an external debugging client API exposed to the remote debugging client.

17. The computer-readable medium of claim 15, wherein the periodic calls are inserted into the client code by instrumentation.

* * * * *